(No Model.)
M. H. ADAMS.
ICE CREAM MOLD.
No. 575,290. Patented Jan. 12, 1897.
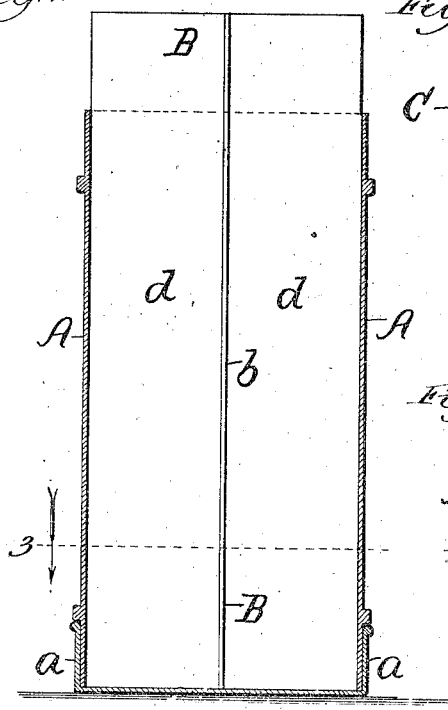
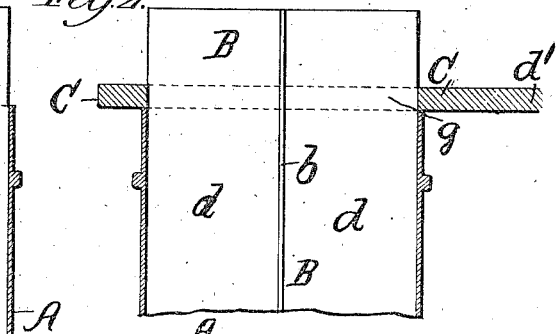
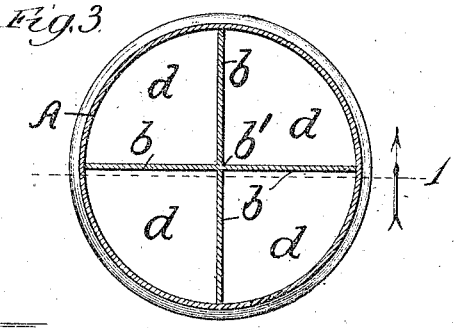
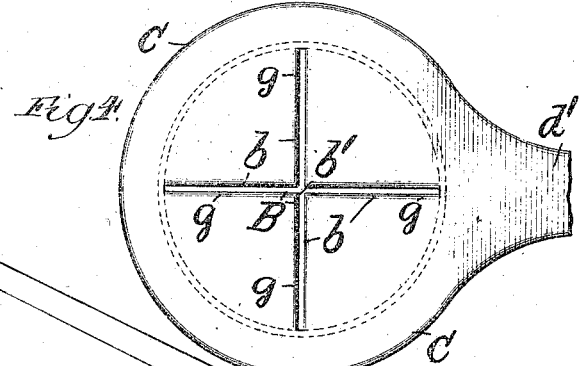
Witnesses:
Chas. E. Gaylord
Lite J. Alt
Inventor,
M. H. Adams.
By L. B. Coupland & Co.
Attys

UNITED STATES PATENT OFFICE.

MAURICE H. ADAMS, OF CHICAGO, ILLINOIS, ASSIGNOR TO CLINTON B. WISER, OF SAME PLACE.

ICE-CREAM MOLD.

SPECIFICATION forming part of Letters Patent No. 575,290, dated January 12, 1897.

Application filed November 19, 1894. Serial No. 529,257. (No model.)

*To all whom it may concern:*

Be it known that I, MAURICE H. ADAMS, a citizen of the United States, residing at Chicago, in the county of Cook and State of Illinois, have invented certain new and useful Improvements in Ice-Cream Molds; and I do hereby declare the following to be a full, clear, and exact description of the invention, such as will enable others skilled in the art to which it appertains to make and use the same.

This invention relates to improvements in the caterers' and confectioners' art of preparing ice-cream compositions and similar delicacies, and has for its object to provide a frozen product of a compound variegated and ornamental character, as will be hereinafter set forth. By the means employed it is possible to produce a frozen mass presenting a number of different colors, which has the appearance of being separated by distinct division-lines, the product as a whole being one solid mass.

In the drawings, Figure 1 is a vertical longitudinal section of a mold on line 1, Fig. 3, looking in the direction indicated by the arrow; Fig. 2, a broken-away vertical longitudinal section showing the drawing-plate in position; Fig. 3, a horizontal section on line 3, Fig. 1; Fig. 4, a plan, and Fig. 5 a perspective, of the product of the mold.

A is a mold-receptacle, B a removable partition device, and C a drawing-plate.

The compound mold-receptacle shown is of a cylindrical form, but it is obvious that molds of different contours may be used. Each end of the mold will usually be provided with a removable cap *a* in order to facilitate the ejection of the contents in one solid mass. The removable partition B consists of four wings *b*, united at their inner edges to the common central core *b'*. This compound partition is in practice loosely inserted in the mold-receptacle and is of a greater length, so as to project from one end thereof, as shown in Figs. 1 and 2. This prolongation or extension of the partition forms a hand-grasp for withdrawing the same and also prevents the cream of different colors from liability of being mixed when filling the mold.

The form of partition shown divides the mold into four compartments *d*, so as to permit of each compartment being filled or charged with frozen cream of a different color and flavor. A partition may be used having a greater or less number of wings than that shown, in accordance with the number of colors it may be desired to show in the product.

A drawing-plate C, provided with a handle *d'*, (shown broken away,) is slotted, as at *g*, to permit of the passage therethrough of the extended end of the wing device and permit the plate to set down closely onto the upper end of the mold, as shown in Fig. 2. This plate is placed in this position after the mold has been filled and is held firmly in place while the partition device is drawn out therethrough, thus preventing any of the mixture from adhering to the partion while it is being withdrawn and leaving the adjacent surfaces of the segmental cream-sections comparatively smooth and in good condition to unite and form one solid mass, but preserving distinct lines *h* between each section or color, as illustrated in Fig. 5, which shows the product as it appears when removed from the mold.

In practice the cream is first frozen in the usual manner, the different colors being of course kept separate. Each compartment of the mold is then filled with cream of a different color, the partition or division device next withdrawn, the end of the mold capped or closed, and then placed in a freezer and subjected to a freezing process, after which the mold is taken out of the freezer and the capped ends removed, when the contents may be conveniently ejected in one compound, variegated, homogeneous mass, yet each color being distinct from the other. The product is then ready to be sliced and served, and presents a very pleasing and attractive appearance.

It is obvious that by this process an endless variety of fanciful designs may be produced, not only in ice-cream, but also in puddings, jellies, and in the line of confections generally, and molded in either a warm or a cold condition.

The wings of the compound partition may be corrugated or otherwise made ornamental instead of being plain, as shown.

The partitions may be arranged in a cylindrical form of a graduating diameter instead of radiating from a common core or hub-center, the different colors being disposed in rings instead of segmental sections. Mottled designs may also be produced by means of this arrangement.

Having thus described my invention, what I claim as new, and desire to secure by Letters Patent, is—

1. The combination with a mold-receptacle, of a compound partition device, loosely inserted therein and having one end projecting therefrom, and a drawing-plate, adapted to slip over the projecting part of the partition, closing that end of the mold and allowing said partition to be withdrawn therethrough, substantially as described.

2. In an ice-cream mold, the combination with a mold-receptacle of a removable partition device, consisting of a number of wings, radiating from a common center and adapted to divide said receptacle into a number of compartments, and a drawing-plate adapted to cover one end of the said receptacle and slotted to permit the removal of the said partition through it substantially as set forth.

In testimony whereof I affix my signature in presence of two witnesses.

MAURICE H. ADAMS.

Witnesses:
L. M. FREEMAN,
L. B. COUPLAND.